(12) United States Patent
Tanaka et al.

(10) Patent No.: US 7,523,804 B2
(45) Date of Patent: Apr. 28, 2009

(54) SMALL SWING TYPE SHOVEL

(75) Inventors: Kiyokazu Tanaka, Hiroshima-shi (JP);
Shintaro Sakitani, Hiroshima-shi (JP);
Takayuki Okunishi, Hiroshima-shi (JP);
Hiroshi Morita, Hiroshima-shi (JP);
Hiroshi Shimokakiuchi, Hiroshima-shi (JP); Yoshiyasu Umezu, Hiroshima-shi (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 520 days.

(21) Appl. No.: 10/506,615

(22) PCT Filed: Mar. 20, 2003

(86) PCT No.: PCT/JP03/03391

§ 371 (c)(1),
(2), (4) Date: Sep. 13, 2004

(87) PCT Pub. No.: WO03/080945

PCT Pub. Date: Oct. 2, 2003

(65) Prior Publication Data

US 2005/0166429 A1 Aug. 4, 2005

(30) Foreign Application Priority Data

| Mar. 26, 2002 | (JP) | ............................. 2002-085313 |
| Mar. 26, 2002 | (JP) | ............................. 2002-085314 |
| Mar. 27, 2002 | (JP) | ............................. 2002-089140 |

(51) Int. Cl.
*B60K 15/00* (2006.01)
*B60P 1/30* (2006.01)

(52) U.S. Cl. .......................................... 180/291; 298/9
(58) Field of Classification Search ................ 180/53.4, 180/69.2, 291, 297, 300, 305, 306; 298/9, 298/17 R, 19 R, 21 R, 22 R
See application file for complete search history.

(56) References Cited

U.S. PATENT DOCUMENTS

| 6,540,036 B1 * | 4/2003 | Sugano ....................... 180/68.1 |
| 6,729,831 B1 * | 5/2004 | Kawamura et al. .......... 414/694 |
| 7,021,074 B2 * | 4/2006 | Hara et al. ..................... 62/244 |

FOREIGN PATENT DOCUMENTS

| JP | 2-80170 | 6/1990 |
| JP | 2-279423 | * 11/1990 |

(Continued)

*Primary Examiner*—Christopher P Ellis
*Assistant Examiner*—Bridget Avery
(74) *Attorney, Agent, or Firm*—Oblon, Spivak, McClelland, Maier & Neustadt, P.C.

(57) ABSTRACT

The present small swing type excavator is characterized by comprising an engine (81) disposed in the rear section of a rotating frame (8) in such a condition that the longitudinal direction thereof is directed to the lateral direction of the rotating frame (8), a hydraulic oil tank (82) disposed on one lateral side in front of the engine (81), a cabin (83) disposed on the other lateral side, an air conditioner (85) disposed under a floor (84) of the cabin (83) and having two surfaces facing to, respectively, the front side and the left outer side of the rotating frame (8), and a fuel tank (86) formed so as to be arranged along at least two surfaces of the front and left side surfaces of the air conditioner (85) and detachably attached to the rotating frame (8).

20 Claims, 9 Drawing Sheets

FOREIGN PATENT DOCUMENTS

| | | |
|---|---|---|
| JP | 5-125742 | 5/1993 |
| JP | 6-320962 * | 11/1994 |
| JP | 7-18698 | 1/1995 |
| JP | 7-21640 | 5/1995 |
| JP | 7-26438 | 6/1995 |
| JP | 7-186742 | 7/1995 |
| JP | 8-13543 | 1/1996 |
| JP | 8-246500 | 9/1996 |
| JP | 9-268597 | 10/1997 |
| JP | 9-315138 | 12/1997 |
| JP | 10-30255 | 2/1998 |
| JP | 10-168942 | 6/1998 |
| JP | 11-21952 | 1/1999 |
| JP | 11-081376 | 3/1999 |
| JP | 11-081377 | 3/1999 |
| JP | 11-081379 | 3/1999 |
| JP | 11-200416 | 7/1999 |
| JP | 11-269923 | 10/1999 |
| JP | 11-269929 | 10/1999 |
| JP | 11-269930 | 10/1999 |
| JP | 11-269931 | 10/1999 |
| JP | 11-269932 | 10/1999 |
| JP | 11-269933 | 10/1999 |
| JP | 2000-054429 | 2/2000 |
| JP | 2001-055760 | 2/2001 |
| JP | 2001-059237 | 3/2001 |
| JP | 2001-159154 | 6/2001 |
| JP | 2001-28878 | 10/2001 |
| JP | 2001-271378 | 10/2001 |
| JP | 2001-288788 | 10/2001 |
| JP | 2001-295319 | 10/2001 |
| JP | 2001-303616 | 10/2001 |
| JP | 2001295319 | 10/2001 |
| JP | 2001-323500 | 11/2001 |

* cited by examiner

SMALL SWING TYPE SHOVEL

TECHNICAL FIELD

The present invention relates to a small swing type excavator, wherein an upper rotating body rotates in such a condition that the rear end thereof hardly projects outside the width of a lower traveling body.

BACKGROUND ART

Among various types of a small hydraulic excavators, so-called small swing type or short-radius excavator, wherein a rear end rotating radius of an upper rotating body is set to about ½ of the width of a lower traveling body, can rotate 360 degrees in such a condition that the rear end of the upper rotating body hardly projects outside the width of the lower traveling body, which is therefore suitable for work in narrow places such as urban work or subway work. In such a short-radius excavator as above, there is a severe restriction on the longitudinal length of the upper rotating body in comparison with common small hydraulic excavators in which the rear end of the upper rotating body projects outside the width of the lower traveling body when rotating, resulting in a reduction in arrangement space for devices, which makes it difficult to an employ device layouts in the common small hydraulic excavators without change. Accordingly, in the art disclosed in, for example, Japanese Patent Laid-Open Publication No. Hei. 11-269931, under the floor of an operator seat covered by a canopy are disposed a fuel tank and a battery to make effective use of the space under the floor. However, known short-radius excavators suffer from the following problems.

(1) Although it has become likely, in recent years, that cabin having a substantially sealed structure adapted to shut out outside air is provided to protect operators against outside noise, dust, etc. and that air conditioner is provided to ensure habitability of the cabin, there is no arrangement space for air conditioner in the case of short-radius excavators.

That is, in the case of large-sized machines, an air conditioner may be provided in a seat stand as shown in the art disclosed in Japanese Patent Laid-Open Publication No. 2001-295319, while in the case of short-radius excavators, there may exist part of an engine under a seat stand, resulting in a difficulty in ensuring enough space in the seat stand.

Therefore, in conventional short-radius excavators, no air conditioner is provided or the volume of a fuel tank is sacrificed to provide an air conditioner as shown in the art disclosed in Japanese Patent Laid-Open Publication No. Hei. 11-269931 above-mentioned, or an air conditioner is mounted on the ceiling of a cabin as shown in the art disclosed in Japanese Patent Laid-Open Publication No. Hei. 9-315138. However, sacrificing the volume of the fuel tank requires short fueling interval, resulting in poor operating efficiency. Also, in the case of mounting air conditioner on the ceiling of cabin, vehicle height is increased, resulting in poor carrying performance.

The present invention has been made in consideration of the above-described circumstances and a first object thereof is to provide a short-radius excavator, wherein the volume of a fuel tank is increased as much as possible with ensuring of an arrangement space for air conditioner to allow effective use of the space in a rotating frame.

(2) Also, with respect to such a short-radius excavator as above, an art for arranging an engine in a slanted manner is disclosed in, for example, Japanese Patent Laid-Open Publication No. Hei. 5-125742. In the art, a hydraulic pump is connected to one side of an output shaft in the longitudinal direction of the engine, while a cooling device is disposed at the other side. In front of the cooling device is disposed a hydraulic oil tank, and in front of the hydraulic pump and under the floor is provided a control valve.

In such a configuration as above, the hydraulic pump and the hydraulic oil tank are wide apart from each other, which results in requiring a large space on a rotating frame for the arrangement of suction pipes that cannot be bent in small radius easily due to the bore thereof having the maximum value among all pipes. Also, providing the control valve under the floor suffers from a problem in that removal work for floor plates, for example, is required to maintain the control valve, resulting in poor maintenance performance.

The present invention has been made in consideration of the above-described circumstances and a second object thereof is to provide a short-radius excavator, wherein problems that occur when arranging an engine in a slanted manner are overcome to allow effective use of the space in a rotating frame.

(3) Moreover, in the case of short-radius excavators in which working device is pivoted movably in the lateral and longitudinal directions in a protruding manner from the front end of upper rotating body, there is a little arrangement space for devices in the longitudinal direction and therefore it is difficult to employ device layouts in common small hydraulic excavators without change. In the art disclosed in Japanese Patent Laid-Open Publication No. Hei. 11-269931 above-mentioned, a control valve, etc. are disposed in the front part of a rotating frame, including the following disadvantages.

In front of the rotating frame is disposed a working device (composed of, for example, a boom, an arm, etc.), and when enlarging an upper rotating body forward to ensure an arrangement space for devices, the front rotating radius increases, resulting in a disadvantage in terms of degree of freedom in, for example, excavating work using the working device. In addition, in front of the upper rotating body is required a lot of space to arrange pipes from the control valve on the upper rotating body through hydraulic actuators such as a hydraulic cylinder of the working device.

The present invention has been made in consideration of the above-described circumstances and a third object thereof is to realize an device layout that makes effective use of the space in the width direction of a rotating frame of a short-radius excavator in which a working device is pivoted movably in the lateral and longitudinal directions in a protruding manner from the front end of the upper rotating body.

DISCLOSURE OF THE INVENTION

According to one aspect of the present invention, for achieving the first object above, there is provided a small swing type excavator, wherein an upper rotating body is mounted rotatably around a vertical shaft on a lower traveling body, rotating radius of a rear end of the upper rotating body being set to about one half of the width of the lower traveling body and devices being mounted on a rotating frame of the upper rotating body, characterized in that an operator cab is disposed on one lateral side on the rotating frame, and that an air conditioner and a fuel tank are provided, respectively, on an inner and an outer side in the width direction of the excavator in a space under a floor of the operator cab, the fuel tank comprising an extension portion extending to at least the front surface side of the air conditioner. It is noted that being set to about one half means that the rear end of the rotating frame does not project outside the width of the lower traveling body, or that projects only up to one half of the vehicle width +10% thereof (the same applies hereinafter).

In accordance with the above-described configuration, the operator cab is disposed on one lateral side on the rotating frame, and the air conditioner and the fuel tank are provided, respectively, on an inner and an outer side in the width direction of the excavator in the space under the floor of the operator cab, the fuel tank comprising an extension portion extending to at least the front surface side of the air conditioner, whereby providing the large-sized fuel tank utilizing the blank space, for example, in front of the air conditioner which has not been conventionally used, the volume of the fuel tank may be increased with ensuring of an arrangement space for the air conditioner. It is noted that if including no heat source, plastic fuel tanks having high-degree of freedom of machining shape have become employed frequently in recent years. Therefore, employing these kinds of plastic fuel tanks allows easy formation even in the case of complicated shapes comprising extension portions.

Meanwhile, in the case of fuel tanks that are frequently filled with oil at work sites, there is a possibility that impurities (sand, mud, etc.) may be mixed thereinto when fueling, resulting in an accumulation of the impurities at the bottom of the tanks with age. The accumulation of the impurities blocks a fuel suction port for an engine as a motor, making the engine inoperative. Hence, it is preferable in the above-described configuration that the fuel tank be detachably attached to the rotating frame in such a condition that the extension portion extends along at least the front surface side of the air conditioner, and that an opening portion capable of taking the fuel tank inside and outside therethrough be provided in an outer peripheral wall of the rotating frame. In this case, when impurities accumulate at the bottom with age, the fuel tank may be detached from the rotating frame to be cleaned on the outside thereof before the engine as a motor becomes inoperative (engine down), and then the impurities accumulated at the bottom of the fuel tank can be removed to prevent engine down. Meanwhile, in the unlikely event that the engine goes down, the fuel tank may be detached from the rotating frame to be cleaned on the outside thereof, and then the impurities accumulated at the bottom of the fuel tank can also be removed to restart the operation of the engine.

Also in the case an opening portion is provided in the outer peripheral wall of the rotating frame, there is a possibility, for example, that sediments generated during construction work may get inside through the opening portion to accumulate around the fuel tank. Hence, it is preferable that a cover portion adapted to cover the opening portion be further provided in the outer peripheral wall of the rotating frame. In this case, since it becomes unlikely that sediments may get inside around the fuel tank through the opening portion and the fuel tank can be protected against unexpected direct hits by sediments, etc., the configuration above is suitable particularly for plastic tanks that have low impact resistance compared to steel ones.

According to another aspect of the present invention,. for achieving the second object above, there is provided a small swing type excavator, wherein an upper rotating body is mounted rotatably around a vertical shaft on a lower traveling body, rotating radius of a rear end of the upper rotating body being set to about one half of the width of the lower traveling body and devices being mounted on a rotating frame of the upper rotating body, characterized in that a power source is disposed in a rear section of the rotating frame in such a manner that said power source laterally stretches long and both lateral ends of said power source are longitudinally shifted each other to be inclined; a hydraulic pump is disposed on one end side closer to the rear side of both the lateral ends of the power source, while a cooling device is disposed on the other end side closer to the front side of both the lateral ends; a fuel tank is disposed in front of the hydraulic pump through a predetermined space; and a hydraulic oil tank is disposed in the predetermined space.

In accordance with the above-described configuration, the power source is disposed in the rear section of the rotating frame in such a manner that said power source laterally stretches long and both lateral ends of said power source are longitudinally shifted each other to be inclined whereby it never occurs that most of the space in the rear section of the rotating frame of the upper rotating body is occupied only by the power source. That is, although the shape of the power source is determined almost automatically to meet the function thereof, when arranging the power source in such an inclined or slanted manner, a certain space (predetermined space) can be ensured in front of one lateral side from where the power source is moved backward away. In this case, it is possible, for example, to dispose a fuel tank having high-degree of freedom of shape under the floor of an operator cab installed in front of the power source, and to dispose a large-sized hydraulic oil tank in the blank space ensured as above. Thus, it is possible to allow for the device arrangement in the rotating frame.

In addition, the hydraulic pump is disposed on one end side closer to the rear side of both the lateral ends of the power source, while the cooling device is disposed on the other end side closer to the front side; the fuel tank is disposed in front of the hydraulic pump through a predetermined space; and the hydraulic oil tank is disposed in the space, whereby the amount of suction pipes on the rotating frame is reduced, and combined with the slanted arrangement of the power source, it is further possible to allow for the device arrangement in the rotating frame.

It is preferable that the fuel tank be disposed on one end side across a swivel joint disposed at the center of rotation, while a control valve be disposed on the other end side, the fuel tank and the control valve being in front of the power source. In this case, it is possible to arrange devices making effective use of the maximum width of the rotating frame, where the volume of the fuel tank is ensured and the maintenance performance of the control valve is improved.

Further, it is preferable that an operator cab be disposed on the upper surface on one lateral side of the rotating frame, and that the fuel tank be arranged under the floor of the operator cab. In this case, other devices can be arranged high in the vehicle, whereby the layout is facilitated.

It is preferable that the hydraulic oil tank be formed into a fan shape in such a manner that the hydraulic oil tank spreads outward from the rotating frame when viewed vertically. In this case, the maximum volume of the hydraulic oil tank can be obtained between the power source arranged in a slanted manner and the fuel tank (or operator cab).

It is preferable that the hydraulic oil tank be formed in such a manner that at least part thereof reaches to under the hydraulic pump. In this case, the volume of the fuel tank can be further increased.

It is preferable that the rotating frame comprise an opening portion for maintenance at the end on the side where the control valve and the cooling device are provided, and a cover portion adapted to cover the opening portion. In this case, the control valve and the cooling device can be maintained easily by opening the cover portion. Thus, devices can be maintained easily if necessary.

According to still another aspect of the present invention, for achieving the third object above, there is provided a small swing type excavator, wherein the upper rotating body is mounted rotatably around a vertical shaft on a lower traveling body, and wherein a working device is attached pivotedly at a front end of the upper rotating body, rotating radius of a rear end of the upper rotating body being set to about one half of the width of the lower traveling body and devices being mounted on a rotating frame of the upper rotating body, characterized in that a hydraulic pump, a power source and a cooling device are disposed laterally in a line as rear row devices in a rear section of the rotating frame; and in front of the rear row devices, a control valve and a hydraulic oil tank are disposed in a line on one lateral side centering on a swivel joint, while a fuel tank is disposed on the other lateral side, the control valve, the hydraulic oil tank, and the fuel tank constituting front row devices.

In accordance with the above-described configuration, the hydraulic pump, the power source and the cooling device are disposed laterally in a line as rear row devices in the rear section of the rotating frame of the upper rotating body; and in front of the rear row devices, the control valve and the hydraulic oil tank are disposed in a line on one lateral side centering on the swivel joint, while the fuel tank is disposed on the other lateral side as front row devices, whereby the space in the width direction of the rotating frame is used effectively in the small swing type excavator wherein a working device is attached pivotedly at the front end of the upper rotating body, and major devices are arranged in two lines from near the center of the rotating frame through the rear section in the longitudinal direction. Consequently, the arrangement of pipes for the major devices is facilitated, and further the maintenance performance thereof is also improved.

Meanwhile, swinging motors have conventionally been arranged in the front part of rotating frames. Hence, it is preferable that a swinging motor be disposed between the swivel joint and the hydraulic oil tank. In this case, further space in the longitudinal direction is ensured to facilitate the device layout.

It is preferable that an air conditioner be disposed between the swivel joint and the fuel tank. In this case, an arrangement space for the air conditioner can be ensured to facilitate the layout thereof.

It is preferable that the fuel tank be arranged under the floor of an operator cab disposed in the upper rotating body. In this case, an arrangement space for the fuel tank can be ensured to facilitate the layout thereof.

In addition, it is preferable that the rear row devices be arranged laterally in the order of hydraulic pump, power source and cooling device, while the front row devices be arranged laterally in the order of fuel tank, swivel joint, hydraulic oil tank and control valve, the fuel tank being arranged under the floor of an operator cab disposed in the upper rotating body and the hydraulic pump being located in a rear side of the fuel tank. In this case, in addition to the advantage of the present invention as described above, it is possible to arrange a short and simple return pipe for putting pressure oil from the control valve back to the hydraulic oil tank, whereby the back pressure of the control valve can be kept at low level. Generally, in the case of a high back pressure of control valve, the discharge resistance of pressure oil causes heat generation and the back pressure is added to supplied pressure from hydraulic pump, resulting in an increase in power required for the hydraulic pump, which consequently runs counter to the saving of energy. Also, there is a possibility of having negative impacts on all aspects of the hydraulic pressure control circuit, such as a case that desired force cannot be obtained when operating each hydraulic actuator. Hence, in the present invention is used a short return pipe, which enables the troubles above to be overcome.

Further, it is possible to dispose a suction pipe that communicates the hydraulic pump and the hydraulic oil tank and a delivery pipe that communicates the hydraulic pump and the control valve between the rear row devices and the front row devices almost linearly, whereby the arrangement of pipes is facilitated and pressure loss in the pipes can be reduced. In particular, the suction pipe has a large diameter, and therefore arranging the pipe with less number of bends has advantages in terms of ensuring the easiness of the arrangement. In addition, although it is often the case that rotating frame is formed into a substantially circular shape to obtain as much an arrangement space for devices on the upper rotating body as possible, the size of the control valve is relatively small, in accordance with the present invention, disposed on the outside of the hydraulic oil tank that requires a large space, whereby the control valve can be arranged along the arc-shape of the rotating frame, improving the usability of the space.

Furthermore, the fuel tank is arranged under the floor of the operator cab, which allows effective use of the arrangement space for devices on the upper rotating body. In addition, the hydraulic oil tank is arranged between the floor of the operator cab and the control valve, whereby it is avoided that noises such as working oil flowing sound and restricting sound from the control valve reach operators in the operator cab to reduce the comfort therein.

As described above, in accordance with the present invention, major devices can be arranged effectively in a small swing type excavator with a small arrangement space for devices, providing a saving of energy at the same time and also giving advantages in terms of controlling a hydraulic circuit, and further noises that may reach operators can be limited.

It is preferable that a battery be disposed on the outside of the fuel tank in the lateral direction. In this case, it is possible to shorten the arrangement space for devices longitudinally, giving advantages in terms of forming a small swing type excavator in which the rear end thereof is within the vehicle width. Also, the battery, which requires to be maintained appropriately, is arranged outside the fuel tank, which facilitates the maintenance of the battery as well as, for example when cleaning the fuel tank, the detachment of the fuel tank by detaching the battery. In particular, since the fuel tank is less often maintained than the battery, the arrangement above is found to be effective.

It is preferable that an air conditioner be disposed over the floor of the operator cab, for example, under the operator seat, or in a cabin if provided for the operator cab. In this case, the space under the floor of the operator cab can be used more effectively, that is, for example, the volume of the fuel tank can be increased. Although small swing type excavators having a canopy, in which the space over the floor of the operator cab is opened outward, include no air conditioner, the space under the floor of the operator cab can be used effectively even in such a case.

It is preferable that the suction pipe that communicates the hydraulic pump and the control valve be guided under the floor of the operator cab, while a pilot pipe that communicates the control valve and a pilot valve disposed over the floor of the operator-cab be guided over the floor of the operator cab. In this case, an arrangement of the pipes in the space under the floor of the operator cab can be formed simply. Also, it is possible to shorten the distance between the one closer to the control valve of the pilot valve above, which are attached in an integrated manner to operating levers that are provided, respectively, on the right and left sides of the operator seat, and the control valve, whereby the pilot pipe can be guided easily.

It is preferable that a swinging motor be disposed in front or rear of the swivel joint. In this case, the space between the hydraulic oil tank, which is enlarged longitudinally to increase the volume thereof, and the fuel tank can be used more effectively.

It is preferable that an oil filler port of the fuel tank be disposed in the rear section thereof and above the hydraulic pump. In this case, it is possible to make effective use of the blank space over the hydraulic pump that is shorter in height than the cooling device.

It is preferable that an operation pattern switching valve for switching a motion pattern of an actuator according to an operation of an operation means among multiple motion patterns be disposed in front of the hydraulic oil tank. In this case, elements having switching portion can be arranged around the control valve in a concentrated manner, which makes it possible to perform maintenance in a lump from the same place.

It is preferable that an operation lock valve for locking actuators hydraulically to be inoperative be disposed in the vicinity of the hydraulic oil tank in front or rear of the control valve. Also in this case, elements having switching portion can be arranged around the control valve in a concentrated manner, which makes it possible to perform maintenance in a lump from the same place.

BRIEF DESCRIPTION OF THE DRAWINGS

FIG. 2A is a horizontal sectional view, while FIG. 2B is a vertical sectional view;

FIG. 5A is a horizontal sectional view, while FIG. 5B is a vertical sectional view;

FIG. 7A is a horizontal sectional view, while FIG. 7B is a vertical sectional view;

FIG. 8A is a horizontal sectional view, while FIG. 8B is a vertical sectional view;

FIG. 9A is a horizontal sectional view, while FIG. 9B is a vertical sectional view; FIG. 10A is a horizontal sectional view, while FIG. 10B is a vertical sectional view.

BEST MODE FOR CARRYING OUT THE INVENTION

Some embodiments of the present invention will hereinafter be described with reference to the accompanying drawings.

(a) FIRST EMBODIMENT

Figure 1:
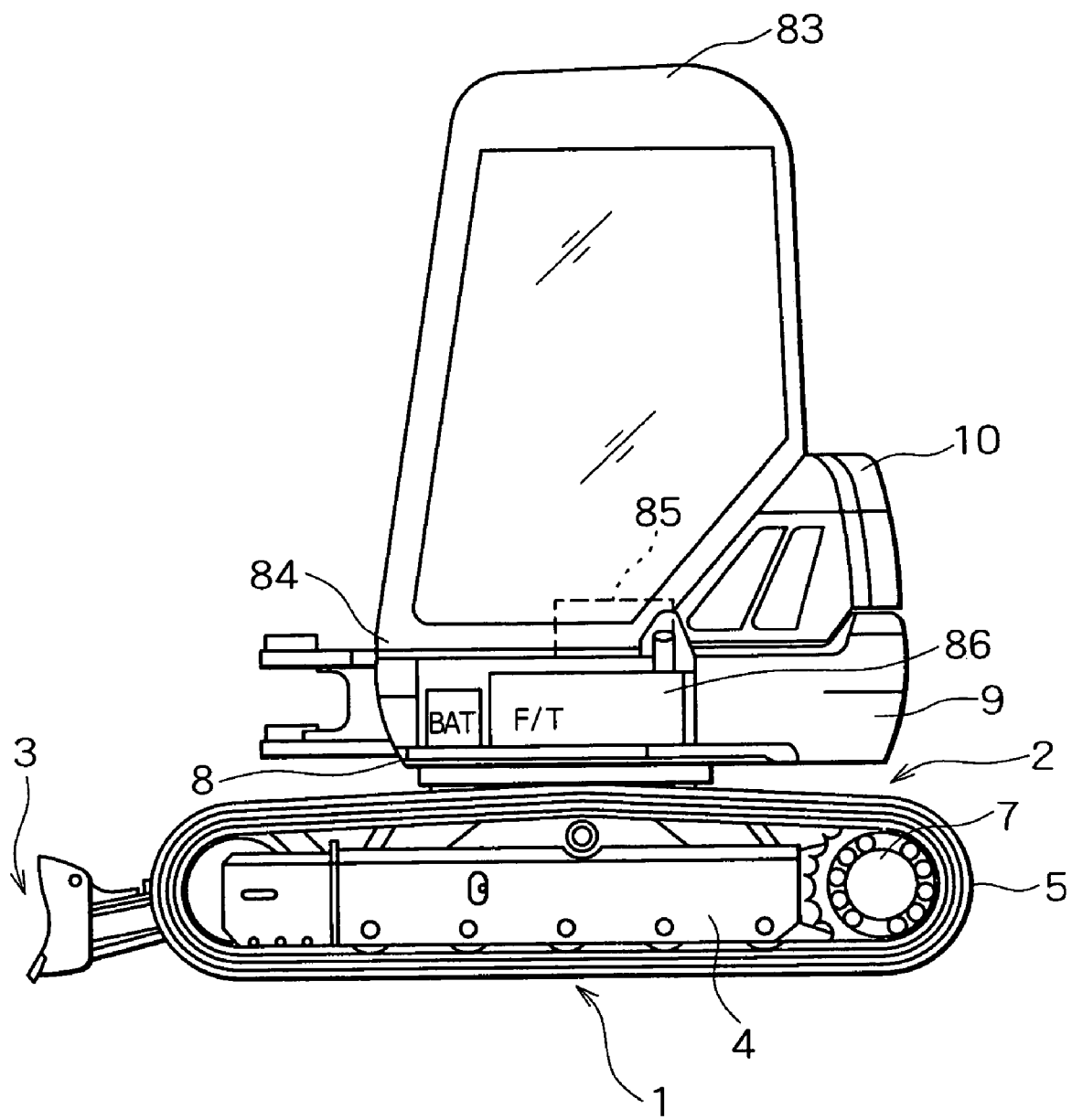
FIG. 1 is a view showing the overall construction of a small swing type excavator.

FIG. 1 shows the overall construction of a so-called small swing type or short-radius excavator among various types of small hydraulic excavators, in which the vehicle body of the short-radius excavator consists of a lower traveling body 1, an upper rotating body 2 mounted rotatably around a vertical shaft on the lower traveling body 1, an excavating attachment not shown in the figure consisting of, for example, a boom pivoted movably in the lateral direction at a support member of a working device that is provided at the front end of the upper rotating body 2 in a protruding manner, and a dozer 3 pivoted movably in the vertical direction to the lower traveling body 1, etc.

The lower traveling body 1 consists of right and left crawler frames 4 and crawlers 5 (only one side, respectively, thereof is shown in the figure), the crawlers 5 on the both sides being driven rotationally separately by right and left traveling motors 7 to run the vehicle.

The upper rotating body 2 comprises a rotating frame 8, the rear end rotating radius of which being set to about one half or of the width of the lower traveling body 1, and a counterweight 9, on the rotating frame 8 being mounted a cabin 83 having a substantially sealed structure to form an operator cab, an engine and devices such as a hydraulic pump driven by the engine, as will be described hereinafter.

The cabin 83 among the above-mentioned components is formed into a box shape having a ceiling, front and rear walls, and right and left walls as peripheral walls, and has the substantially sealed structure, which is adapted to shut out outside air to protect operators against outside noise, dust, etc., wherein an air conditioner 85 is provided to ensure habitability thereof.

The overall construction of this kind of short-radius excavator can be applied similarly in the second to fourth embodiments described hereinafter.

Continuously, the device layout in the rotating frame 8 that characterizes the present first embodiment will be described in detail with reference to FIGS. 2A and 2B. It is noted that the left side in FIG. 2A corresponds to front side, the right side to rear side, the upper side to right side, and the lower side to left side.

Figure 2A:
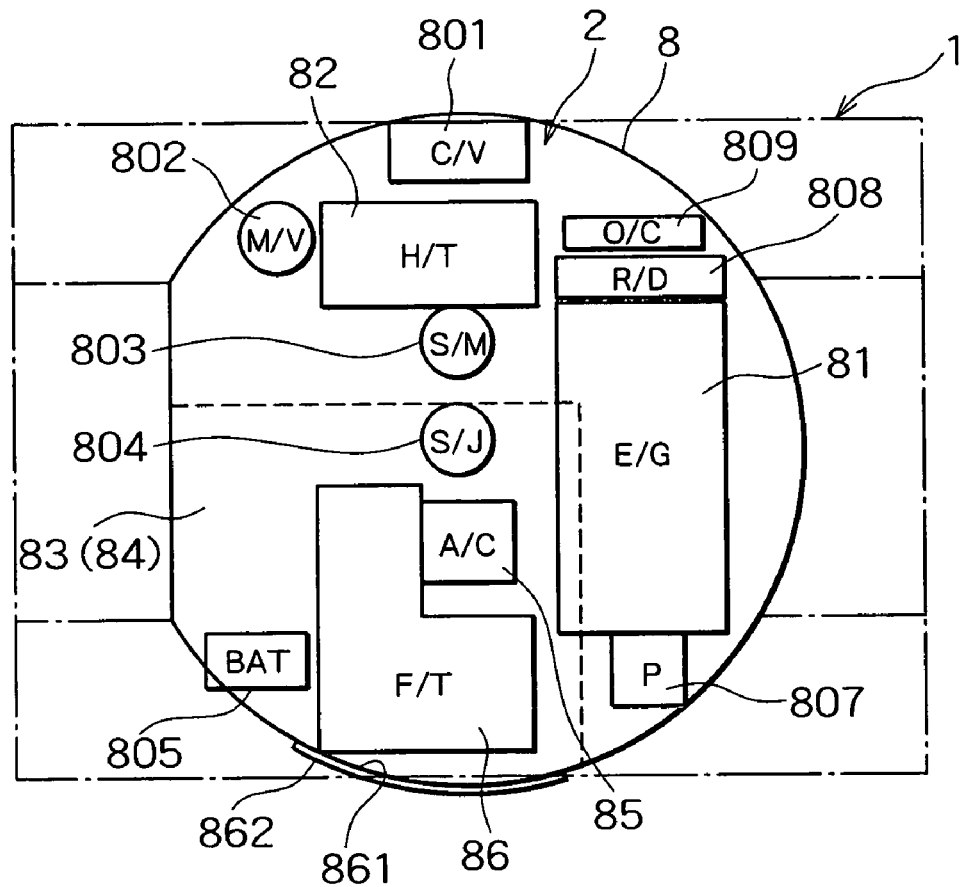
FIGS. 2A, 2B are schematic views showing the general structure under the floor of a cabin of a small swing type excavator according to the first embodiment of the present invention (with a fuel tank fixed), where
Figure 2B:
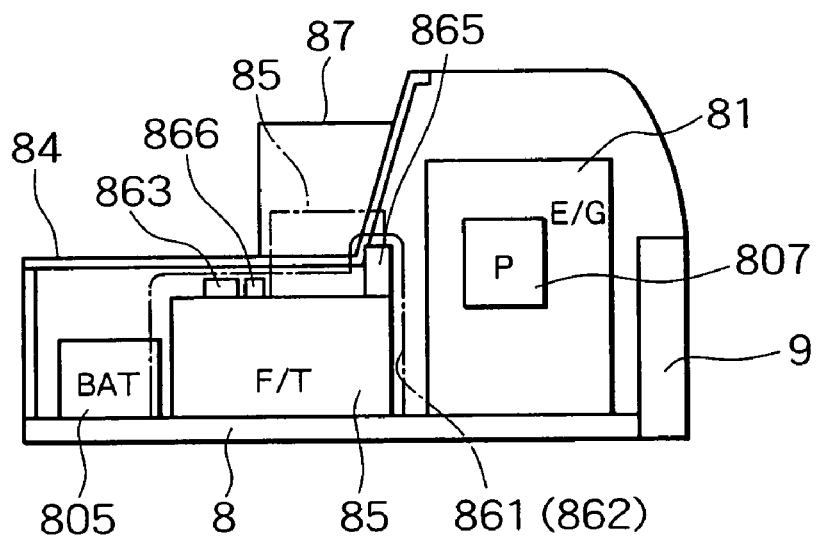
Figure 3:
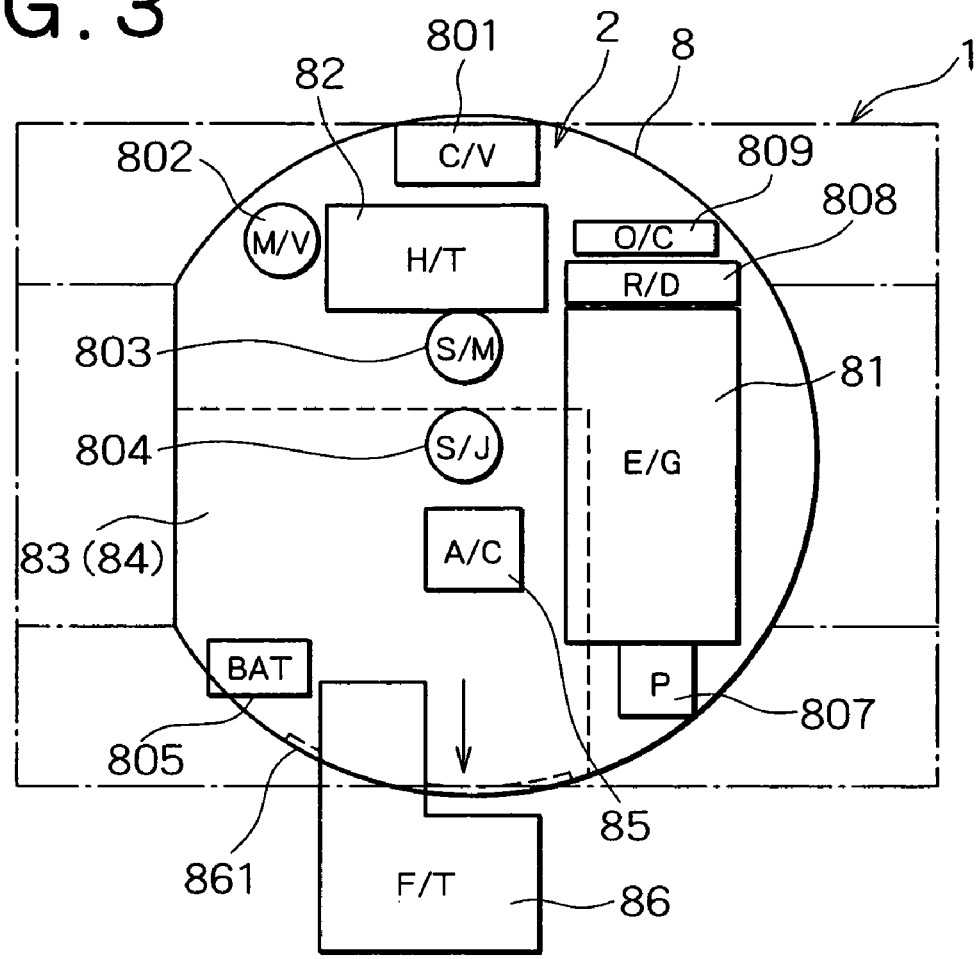
FIG. 3 is a horizontal sectional view showing the general structure under the floor of the cabin of the small swing type excavator according to the first embodiment of the present invention (when removing the fuel tank)

As shown in FIGS. 2A and 2B, the rotating frame 8 is formed into a little flattened cylinder shape cutting off part of the front side, and a floor 84 (flat part under the operator cab) of the cabin 83 is formed substantially within the left half from the front side through the central portion (the floor 84 is represented by the dashed line in FIG. 2A). The rotating frame 8 is set to be shorter longitudinally, while a little longer laterally in comparison with common small hydraulic excavators.

In the present first embodiment, there is provided an engine (referred to as E/G in FIG. 2) 81 as a power source mounted transversely with an output shaft thereof extending laterally in the rear section of the rotating frame 8, a hydraulic oil tank (H/T likewise as above) 82 disposed in front and right of the engine 81, the cabin 83 disposed in front and left of the engine 81, an air conditioner (A/C likewise as above) 85 disposed on an inner side in the width direction of the excavator in the space under the floor 84 of the cabin 83, and a fuel tank (F/T likewise as above) 86 disposed on the outside of the air conditioner 85.

It is noted that the numeral 801 indicates a control valve (C/V likewise as above), 802 a manipulation pattern switching valve (M/V likewise as above), 803 a swinging motor. (S/M likewise as above), 804 a swivel joint (S/J likewise as above), 805 a battery (BAT likewise as above), 807 a hydraulic pump (P likewise as above), 808 a radiator (R/D likewise as above), and 809 an oil cooler (O/C likewise as above).

The engine 81 is, for example, a diesel engine, wherein the hydraulic pump 807 is connected to one end of the output shaft, while a fan, not shown in the figure, is attached to the other end thereof to air-cool the radiator 808 and the oil cooler 809.

The hydraulic oil tank 82 is a steel tank for storing hydraulic oil from each hydraulic device. Then, an oil filler port extends up to the outer peripheral wall of the rotating frame 8, although not shown in the figure, which allows fueling of the tank. Also, an oil discharge port closed with a cap is provided at a position where an operator can access from under the rotating frame 8, and then remove the cap to recover discharge oil when performing maintenance.

In the air conditioner 85, while part of the unit (although there are included a condenser unit and an air conditioner unit, the former is here ignored, the same applying hereinafter) protrudes inside a seat stand 87, most part of the unit is arranged under the floor 84 of the cabin 83 (the part arranged under the floor will hereinafter be referred to simply as the air conditioner 85).

The fuel tank 86 is a tank having a complicated shape that stores fuel for the engine 81, which is made of, for example, plastics with remarkable workability. The fuel tank 86 is installed in the extremely narrow space of under the floor 84 of the cabin 83 together with the air conditioner 85, and thereby has a flattened shape wholly that has not conventionally been able to allow for enough volume. Hence in the present first embodiment, the structure of the fuel tank 86 is adapted to comprise an extension portion extending to at least the front surface side of the air conditioner 85, whereby an ever-larger volume can be ensured.

Figure 4:
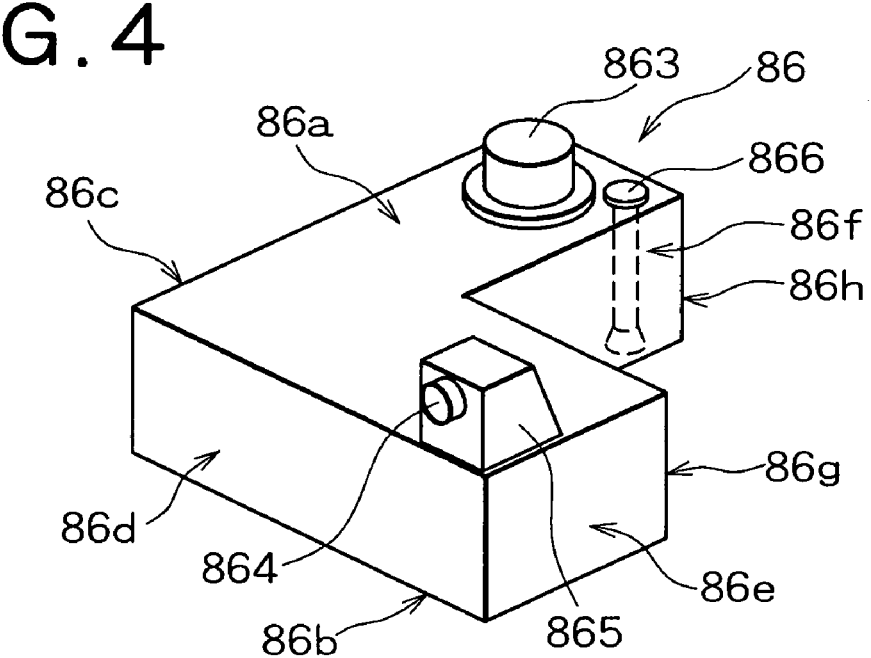
FIG. 4 is a perspective view showing the general structure of the fuel tank according to the first embodiment of the present invention.

To be more concrete, the fuel tank 86 consists of, as shown in FIG. 4, a ceiling surface 86a and a bottom surface 86b formed into an L shape, a front surface 86c, a left side surface 86d, rear surfaces 86e and 86f, and right side surfaces 86g and 86h formed into respective rectangular shapes, the left side surface 86g and the rear surface 86f being arranged along, respectively, the left side surface and the front surface of the air conditioner 85. Even complicated shapes such as the L shape above can be formed easily by means, for example, of injection molding if the tank is made of plastics.

Then, in front and right of the ceiling surface 86a is provided a sensor 863 to detect the amount of fuel in the fuel tank 86, and for example, a warning light in the cabin 83 is to be turned on by receiving a signal from the sensor 863 when the fuel gets low.

The sensor 863 is formed with, for example, a float switch, which is to be taken outside in an integrated manner with the tank when taking the tank outside as will be described hereinafter. Therefore, the sensor 863 is connected to a guided wire in the rotating frame 8 through a connector not shown in the figure. Then, the connector is to be disconnected to take the tank outside.

Also, an oil filler port 865 closed with a cap 864 protrudes in rear and left of the ceiling surface 86a. The oil filler port 865 extends up to the outer wall of the rotating frame 8, which makes it possible to fuel the tank by removing the cap 864 in such a condition that the tank is installed in a predetermined position.

Further, a fuel suction port 866 is provided in an appropriate position of the ceiling surface 86a, the fuel suction port 866 being connected to a guided pipe that leads to a fuel feeding device for the engine 81 in the rotating frame through a joint not shown in the figure. Then, the joint is to be disconnected to take the tank outside. It is noted that it is preferable to provide the position of the fuel suction port 866 in the vicinity of the center of rotation of the excavator as close as possible to prevent air intake, even in the case of work on an inclined surface, which can be made responsive by giving a guided pipe suitable in the tank to the fuel suction port 866, unlike in the case of the sensor 863 above.

In the present first embodiment, the fuel tank 86 is detachably attached to the rotating frame using, for example, a band not shown in the figure, particularly in case of contamination of foreign materials into the tank, where the fuel tank 86 can be taken outside the rotating frame 8 by removing the band. Therefore, a holding part, etc. for taking the tank outside may be provided in an appropriate position of the fuel tank 86.

Also in accordance with the above mentioned, in the rotating frame 8 is provided an opening portion 861 having an area capable of taking the fuel tank 86 outside together with the sensor 863 in the take-out direction of the fuel tank 86, as well as a cover portion 862 adapted to cover the opening portion 861 while not taking the tank 86 outside. The cover portion 862 is made of steel, the same material as the outer wall, and is fastened with bolts around the opening portion 861 of the outer wall, while may be hinged openably to the opening portion 861 for example.

Further, frictional force at the bottom of the fuel tank 86 in the rotating frame 8 may be reduced to make it easy to take the tank outside, and a sliding rail, etc. may be provided along the movement route of the tank so that the tank is returned to the original position thereof accurately again.

In addition to above, although on the rotating frame 8 are provided an indefinitely large number of guided pipes and guided wires to connect each of the foregoing devices, the arrangement thereof is not shown in the figure. However, it goes without saying that the arrangement of each device is determined in such a manner that the length of the guided pipes and guided wires is as short as possible.

The general procedure for maintenance of the fuel tank will hereinafter be described.

As shown in FIG. 2A, the fuel tank 86 is arranged along two surfaces of the front and left side surfaces of the air conditioner 85, and there is fixed to the rotating frame 8 using the band above.

When performing maintenance, an operator first opens the cover portion 862 of the rotating frame 8, and disconnect the connector of the sensor 863 of the fuel tank 86 from the guided wire in the rotating frame 8 through the opening portion 861 as well as disconnect the joint of the fuel suction port 866 from the guided pipe in the rotating frame 8, and then removes the band fixing the fuel tank 86. Then, the fuel tank 86 is pulled toward this side in the figure from a fixed position on the rotating frame 8 through the opening portion 861.

Next, a simple pump, etc. are connected to the joint of the fuel suction port 866 of the fuel tank 86 taken outside to drain remaining fuel completely, and then the inside of the tank is cleaned with kerosene, etc. to remove foreign materials. Thus, impurities accumulated at the bottom of the fuel tank 86 can be removed.

After performing the steps above, the fuel tank 86 is returned to the original position thereof by a reverse procedure to above and is fixed using the band, and the connector of the sensor 863 of the fuel tank 86 is connected to the guided wire in the rotating frame 8 as well as the joint of the fuel suction port 866 is connected to the guided pipe in the rotating frame 8, and then the opening portion 861 is closed with the cover portion 862.

Thus, the fuel tank 86 may be detached from the rotating frame 8 to be cleaned on the outside thereof before the engine 81 becomes inoperative (engine down), and then impurities accumulated at the bottom of the fuel tank 86 can be removed to prevent engine down. Meanwhile, in the unlikely event that the engine goes down, the fuel tank 86 may be detached from the rotating frame 8 to be cleaned on the outside thereof, and then impurities accumulated at the bottom of the fuel tank 86 can also be removed to restart the operation of the engine 81. Also, it is possible to make it unlikely by means of the cover portion 862 that sediments may get inside around the fuel tank 86 through the opening portion 861, and to protect the fuel tank 86 against unexpected direct hits by sediments, etc.

As explained above, in the present first embodiment, the cabin 83 is disposed on one lateral side on the rotating frame 8 of the upper rotating body 2, and the air conditioner 85 and the fuel tank 86 are provided, respectively, on an inner and an outer side in the width direction of the excavator in the space under the floor 84 of the cabin 83, the fuel tank 86 comprising the extension portion extending to at least the front surface side of the air conditioner 85, whereby providing the large-sized fuel tank 86 utilizing the blank space in front of the air conditioner 85 which has not been conventionally used, the volume of the fuel tank 86 may be increased with ensuring of an arrangement space for the air conditioner 85. Therefore, it is possible to ensure the volume of the fuel tank 86 to increase the fueling interval, resulting in an improvement in operating efficiency.

It is noted that the fuel tank 86, although formed in an L shape when viewed vertically and arranged along the front and left side surfaces of the air conditioner 85 in the first embodiment above, may be arranged along three surfaces of both the front and rear surfaces and the left side surface in some cases (in these cases, the fuel tank is to be formed into a U shape when viewed vertically). Also, it will be appreciated that in the case the overall arrangement of the rotating frame 8 above is reversed laterally, the fuel tank may be formed in accordance with such arrangement (in this case, the fuel tank is to be arranged along the front (and rear) and left side surfaces of the air conditioner).

(b) SECOND EMBODIMENT

The device layout in a rotating frame 8 that characterizes the present second embodiment will be described in detail with reference to FIGS. 5A and 5B. It is noted that the left side in FIG. 5A corresponds to front side, the right side to rear side, the upper side to right side, and the lower side to left side, and for the sake of convenience, the same numerals are assigned to components in FIGS. 5A and 5B in common with those in the first embodiment above.

Figure 5A:
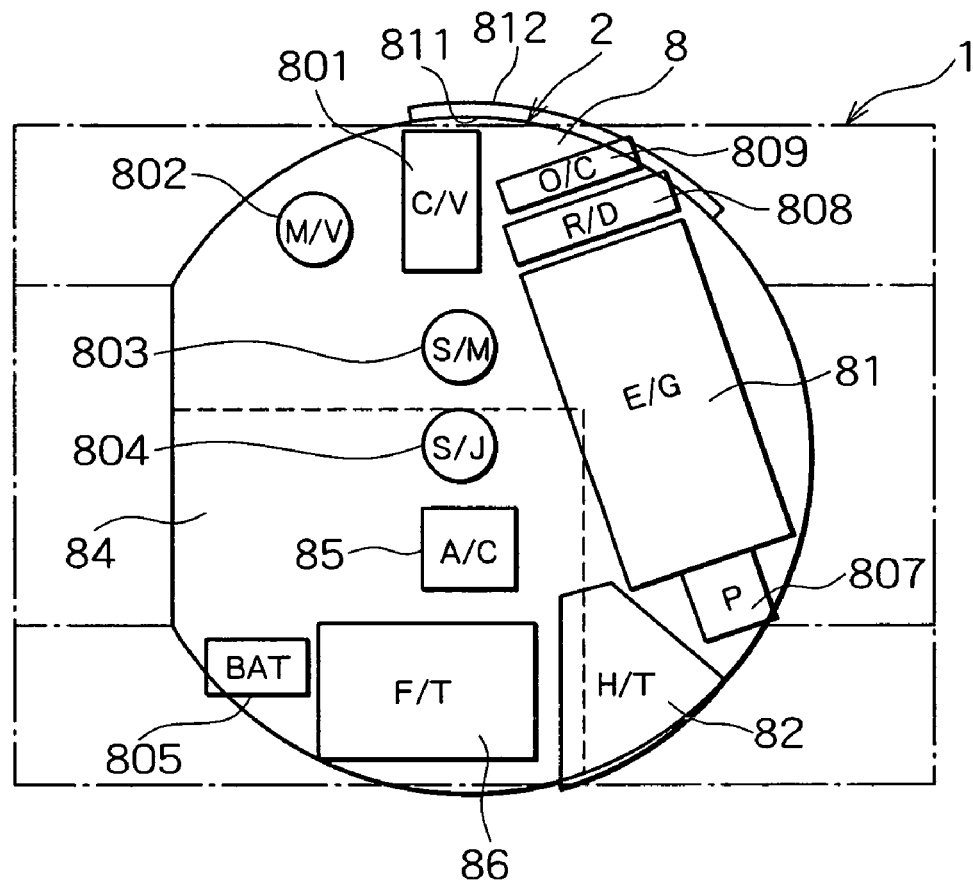
FIGS. 5A, 5B are schematic views showing the general structure under the floor of a cabin of a small swing type excavator according to the second embodiment of the present invention, where
Figure 5B:
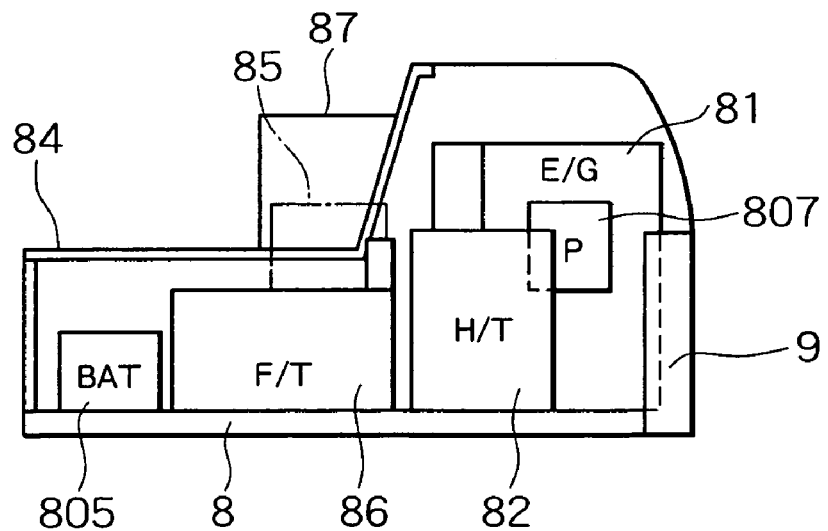

The configuration of the rotating frame 8 shown in FIGS. 5A and 5B is the same as that of the first embodiment. The floor 84 is represented by the dashed line in FIG. 5A.

In the present second embodiment, an engine (E/G) 81 as a power source is disposed in the rear section of the rotating frame 8, though in a laterally stretched long attitude, in a slanted manner where both the lateral ends are longitudinally shifted each other so that the longitudinal direction thereof is arranged at a predetermined angle with the lateral center line of the rotating frame 8. Then, on the right end side (one end side) closer to the front side of the engine 8 in the slanted manner are disposed a radiator (R/D) 808 and an oil cooler (O/C) 809 as cooling devices in this order outward, while on the left end side (the other end side) closer to the rear side than the right end side is provided a hydraulic pump (P) 807. In front of the engine 81, there are disposed a swinging motor (S/M) 803 and a control valve (C/V) 801 in this order on the right side of a swivel joint (S/J) 804 arranged at the center of rotation of the rotating frame 8, while on the left side thereof an air conditioner (A/C) 85 and a fuel tank (F/T) 86 in this order, and in the space (corresponding to the predetermined space) formed between the hydraulic pump 807 and the fuel tank 86 is disposed a hydraulic oil tank (H/T) 82. It is noted that the numeral 802 indicates an operation or a manipulation pattern switching valve (M/V), while 805 a battery (BAT). Here, the reason for arranging the devices centering on the swivel joint 804 is that the fuel tank 86 and the control valve 801 can be arranged separately close to the vicinity of the outer peripheral wall where the width of the rotating frame 8 is maximized, whereby the volume of the fuel tank 86 can be ensured and the maintenance performance of the control valve 801 can be improved.

To the left end of an output shaft of the engine 81 that extends laterally is connected the hydraulic pump 807.

The hydraulic oil tank 82 is formed into a fan shape in such a manner that the tank 82 spreads outward from the rotating frame 2 when viewed vertically so as to fit into the space between the hydraulic pump 807 and the fuel tank 86, which is generated by arranging the engine 81 in the slanted manner.

Figure 6:
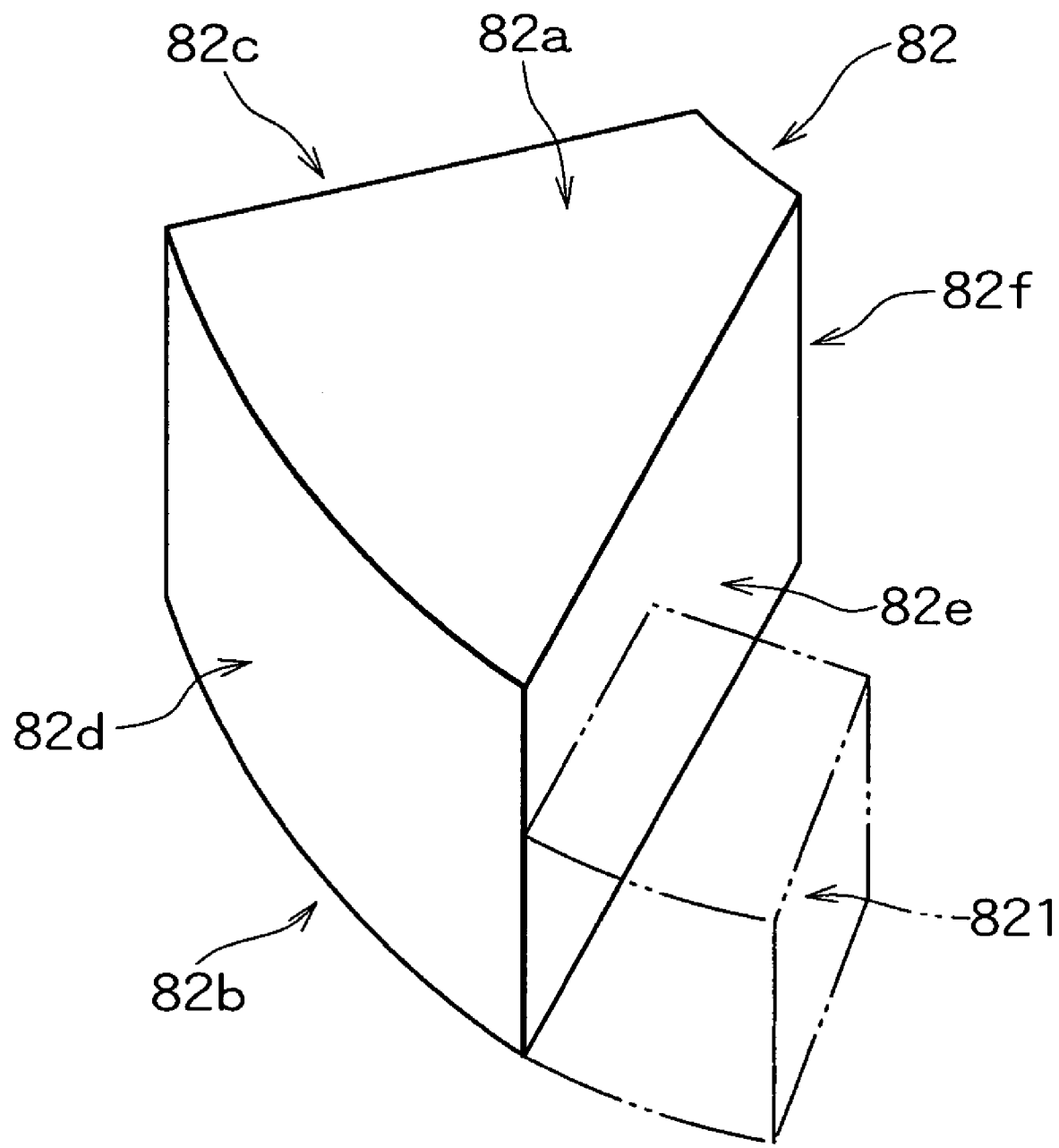
FIG. 6 is a perspective view showing the general structure of the fuel tank according to the second embodiment of the present invention.

To be more concrete, the hydraulic oil tank 82 consists of, as shown in FIG. 6, a ceiling surface 82a and a bottom surface 82b formed into a fan shape, a left side surface 82d curved with a predetermined curvature along the outer wall of the rotating frame 8, a front surface 82c, a rear surface 82e, and a right side surface 82f formed into respective rectangular shapes.

Meanwhile, as shown in FIG. 5B, there generally exists a space under the hydraulic pump 807, which may be further utilized. For example, a projecting portion 821 can be provided at the left lower part of the rear surface 82e of the hydraulic oil tank 82 as shown by the two-dot chain line in FIG. 6. The projecting portion 821 has a height capable of getting under the hydraulic pump 807 and a geometry capable of having no contact with the body of the engine 81. Thus, the maximum volume of the hydraulic oil tank 82 can be obtained. It is noted that depending on the arrangement of other devices in the rotating frame 8, the whole of the hydraulic oil tank 82 may be fitted into the space under the hydraulic pump 807.

Also, an oil filler port extends up to the outer peripheral wall of the rotating frame 8, although not shown in the figure, which allows fueling of the tank 82. Further, an oil discharge port closed with a cap is provided at a position where workers can access from under the rotating frame 8, and then remove the cap to recover discharge oil when performing maintenance.

In the air conditioner 85, while part of the unit protrudes inside a seat stand 87, most part of the unit is arranged under the floor 84 of the cabin 83 of the rotating frame 8.

An oil filler port of the fuel tank 86 extends up to the outer peripheral wall of the rotating frame 8, although not shown in the figure, which allows fueling of the tank 86. It is easy to do the layout of the fuel tank 86, due to the excellent workability thereof, even in such a narrow space as under the floor 84 of the cabin 83 where the fuel tank 86 is arranged together with the air conditioner 85. Then, other devices can be arranged high in the vehicle, whereby the layout is facilitated.

In addition to above, on the right side of the rotating frame 8 is provided an opening portion 811 having an area capable of maintaining the control valve 801, the radiator 808 and the oil cooler 809, etc., as well as a cover portion 812 adapted to cover the opening portion 811 while not maintaining such devices. The cover portion 812 is made of steel, the same material as the outer wall, and is fastened with bolts around the opening portion 811 of the outer wall, while may be hinged openably to the opening portion 811 for example. Thus, devices can be maintained easily if necessary by opening the cover portion 812.

As explained above, in the present second embodiment, the engine 81 is disposed in the rear section of the rotating frame 8 in a laterally stretched long attitude and a slanted manner where both the lateral ends are longitudinally shifted, whereby it never occurs that most of the space in the rear section of the rotating frame of the upper rotating body is occupied only by the engine 81. That is, although the shape of the engine 81 is determined almost automatically to meet the function thereof, when arranging the engine 81 in such a slanted manner, a certain space can be ensured in front of one lateral side from where the power source is moved backward away. In this case, it is possible, for example, to dispose the fuel tank 86 having high-degree of freedom of shape under the floor 84 of the cabin 83 installed in front of the engine 81, and to dispose the large-sized hydraulic oil tank 82 in the blank space ensured as above. Thus, it is possible to allow for the device arrangement in the rotating frame.

In addition, the hydraulic pump 807 is disposed on one end side closer to the rear side of both the lateral ends of the engine 81, while the radiator 808 and the oil cooler 809 are disposed on the other end side closer to the front side; the fuel tank 86 is disposed in front of the hydraulic pump 807 through the foregoing predetermined space; and the hydraulic oil tank 82 is disposed in this space, whereby the amount of suction pipes on the rotating frame 8 is reduced, and combined with the slanted arrangement of the engine 81, it is further possible to allow for the device arrangement in the rotating frame 8.

It is noted that although the working oil tank 82 is formed into a fan shape when viewed vertically in the second embodiment above, it is possible to adopt every kind of other shapes capable of realizing large volume. Also, it will be appreciated that the overall arrangement of the rotating frame 8 above may be reversed laterally and the fuel tank may be formed in accordance with such arrangement.

Also, the swinging motor 803, although disposed between the control valve 801 and the swivel joint 804 in the second embodiment above, is not necessarily a large-sized device, and thereby can be arranged in another place.

Further, the air conditioner 85, although disposed between the swivel joint 804 and the fuel tank 86 in the second embodiment above, is not required to be installed in such a case where no cabin 83 is provided, which further allows for the device arrangement.

Meanwhile, although in the first and second embodiments above, it is not necessarily assumed that the working device is attached pivotedly in the lateral and longitudinal directions in a protruding manner from the front end of the upper rotating body 2 in FIG. 1, the invention according to the third to fifth embodiments described hereinafter is directed to short-radius excavators in which a working device is attached pivotedly the lateral and longitudinal directions in a protruding manner from the front end of the upper rotating body 2. The embodiments will hereinafter be described.

(c) THIRD EMBODIMENT

The device layout in a rotating frame 8 that characterizes the present third embodiment will be described in detail with reference to FIGS. 7A and 7B. It is noted the left side in FIG. 7A corresponds to front side, the right side to rear side, the upper side to right side, and the lower side to left side, and for the sake of convenience, the same numerals are assigned to components in FIGS. 7A and 7B in common with those in the first and second embodiments above.

Figure 7A:
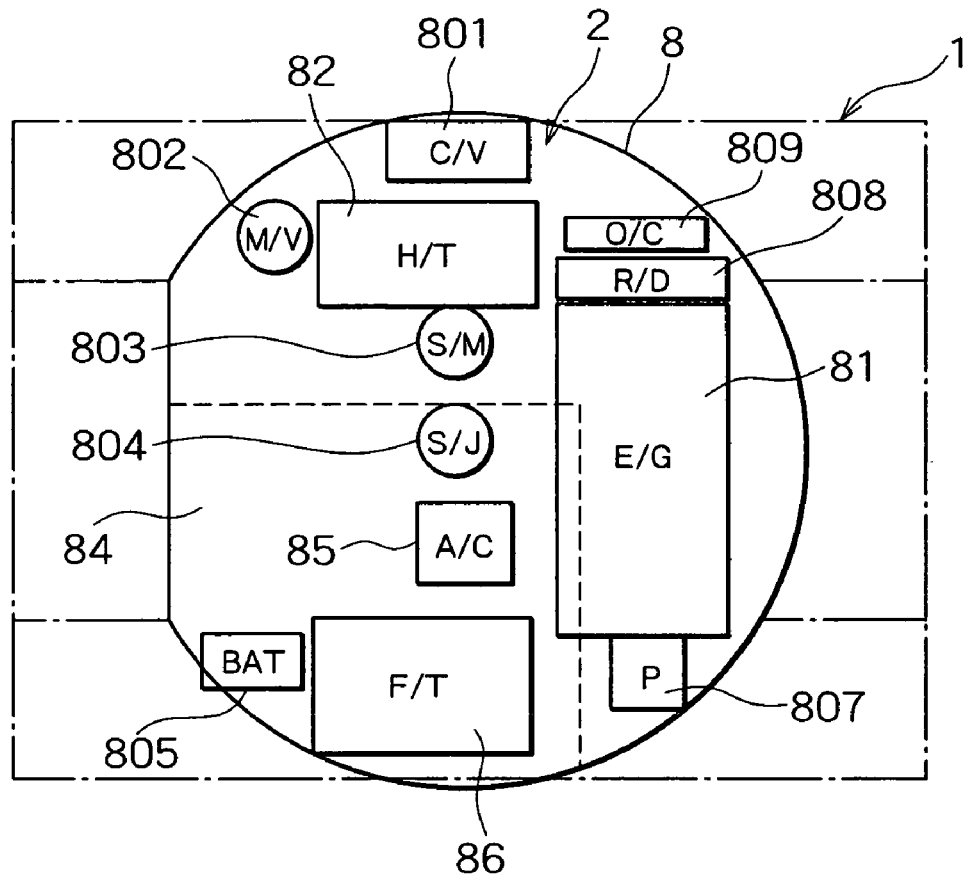
FIGS. 7A, 7B are schematic views showing the general structure under the floor of a cabin of a small swing type excavator according to the third embodiment of the present invention, where
Figure 7B:
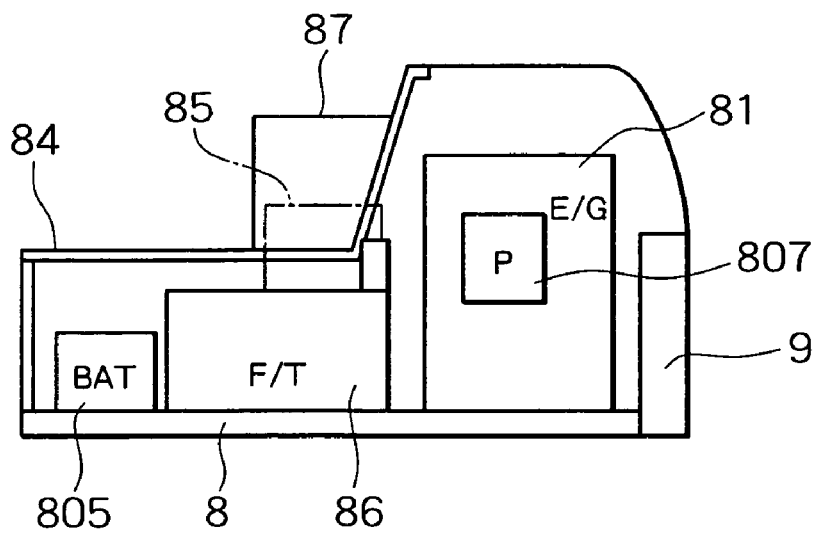

The configuration of the rotating frame 8 shown in FIGS. 7A and 7B is the same as that of the first and second embodiments. The floor 84 is represented by the dashed line in FIG. 7A.

In the present third embodiment, a hydraulic pump (P) 807, an engine (E/G) 81, a radiator (R/D) 808, and an oil cooler (O/C) 809 are disposed in a line from the left to right side in this order as rear row devices in the rear section of the rotating frame 8; and in front of the rear row devices, a swinging motor (S/M) 803, a hydraulic oil tank (H/T) 82, and a control valve (C/V) 801 are disposed in a line in this order on the right side of a swivel joint (S/J) 804, while on the left side thereof an air conditioner (A/C) 85 and a fuel tank (F/T) 86 in a line in this order as front row devices. It is noted that the numeral 802 indicates an operation or a manipulation pattern switching valve (M/V), while 805 a battery (BAT).

An oil discharge port of the hydraulic oil tank 82 closed with a cap is provided at a position where an operators can access from under the rotating frame 8, and then remove the cap to recover discharge oil when performing maintenance.

In the air conditioner 85, while part of the unit protrudes inside a seat stand 87, most part of the unit is arranged under the floor 84 of the cabin 83 of the rotating frame 8.

An oil filler port of the fuel tank 86 extends up to the outer peripheral wall of the rotating frame 8, although not shown in the figure, which allows fueling of the tank.

As explained above, in the present third embodiment, the hydraulic pump (P) 807, the engine (E/G) 81, the radiator (R/D) 808, and the oil cooler (O/C) 809 are disposed in a line from the left to right side in this order as rear row devices in the rear section of the rotating frame 8 of the upper rotating body 2; and in front of the rear row devices, the swinging motor (S/M) 803, the hydraulic oil tank (H/T) 82, and the control valve (C/V) 801 are disposed in a line in this order on the right side of the swivel joint (S/J) 804, while on the left side thereof the air conditioner (A/C) 85 and the fuel tank (F/T) 86 in a line in this order as front row devices, whereby the space in the width direction of the rotating frame 8 is used effectively in the short-radius excavator in which a working device is attached pivotedly at the front end of the upper rotating body 2, and major devices are arranged in two lines from near the center of the rotating frame 8 through the rear section in the longitudinal direction. Consequently, the arrangement of pipes for the major devices is facilitated, and further the maintenance performance thereof is also improved. Additionally, arrangement spaces for the air conditioner 85 and the fuel tank 86 can be ensured to facilitate the layout thereof.

(d) FOURTH EMBODIMENT

Meanwhile, in the third embodiment above, the rear row devices only may be rotated by 180 degrees to be arranged against the front row devices. The present fourth embodiment, which has been made focusing on this point, will hereinafter be described with reference to FIGS. 8A and 8B. It is noted that the left side in FIG. 8A corresponds to front side, the right side to rear side, the upper side to right side, and the lower side to left side, and for the sake of convenience, the same numerals are assigned to components in common with those in the third embodiment above to omit redundant descriptions as much as possible.

Figure 8A:
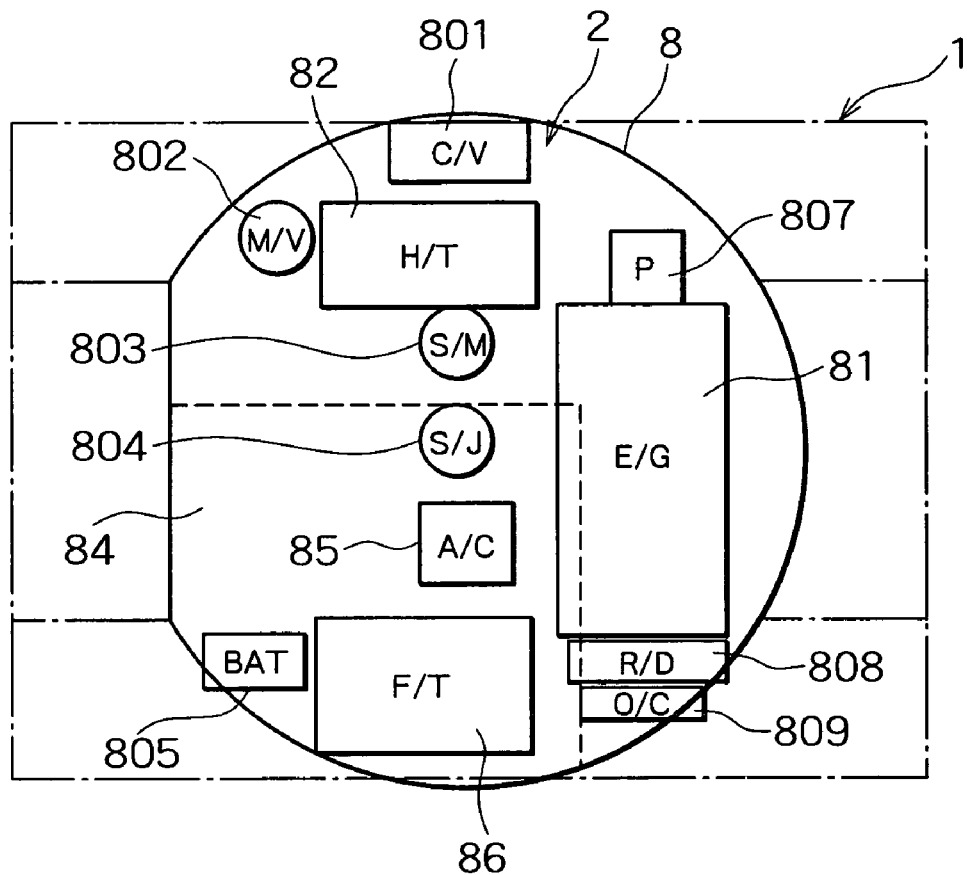
FIGS. 8A, 8B are schematic views showing the general structure under the floor of a cabin of a small swing type excavator according to the fourth embodiment of the present invention, where
Figure 8B:
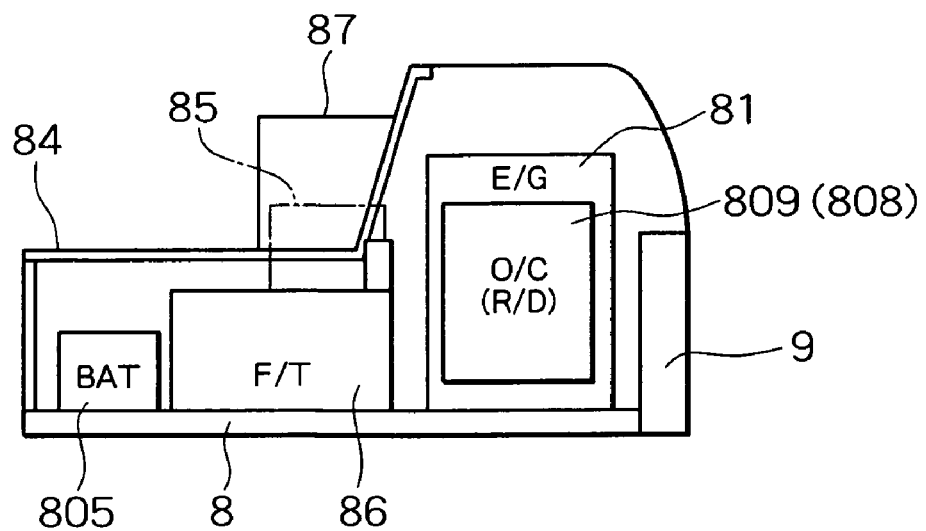

As shown in FIGS. 8A and 8B, in the present fourth embodiment, an oil cooler (O/C) 809 and a radiator (R/D) 808 as cooling devices, an engine (E/G) 81 as a power source, and a hydraulic pump (P) 807 are disposed in a line from the left to right side in this order as rear row devices in the rear section of a rotating frame 8 of an upper rotating body 2; and in front of the rear row devices, a swinging motor (S/M) 803, a hydraulic oil tank (H/T) 82, and a control valve (C/V) 801 are disposed in a line in this order on the right side of a swivel joint (S/J) 804, while on the left side thereof an air conditioner (A/C) 85 and a fuel tank (F/T) 86 in a line in this order as front row devices. It is noted that the numeral 802 indicates an operator or a manipulation pattern switching valve (M/V), while 805 a battery (BAT).

The hydraulic oil tank 82, the air conditioner 85, the fuel tank 86, etc. are similar to those in the first embodiment above, and the same applies to the point that on the rotating frame 8 are provided an indefinitely large number of guided pipes and electric wires to connect each of the foregoing devices.

In the present fourth embodiment, the hydraulic oil tank 82 is disposed immediately in front of the hydraulic pump 807, and therefore the length of a suction pipe that communicates the hydraulic pump 807 and the hydraulic oil tank 82 is reduced. Since this suction pipe has a large diameter, facilitating the arrangement thereof gives a great advantage. The other configurations of the present fourth embodiment is the same as those of the third embodiment above, and therefore it will be appreciated that the present fourth embodiment gives the same advantage as the third embodiment above.

It is noted that the configurations of the third and fourth embodiments above may be reversed laterally, and further the manipulation pattern switching valve 802 and the battery 805 may be included in the arrangement of the other devices.

Also, the swinging motor 803, although disposed between the swivel joint 804 and the hydraulic oil tank 82 in the third and fourth embodiments above to ensure as large a space as possible in the longitudinal direction, may similarly be excluded from the front row devices also in this case.

Further, the air conditioner 85, although disposed between the swivel joint 804 and the fuel tank 86 in the third and fourth embodiments above to ensure an arrangement space for the air conditioner 85 in the short-radius excavator in which a working device is attached pivotedly at the front end of the upper rotating body 2, may be excluded from the front row devices in such a case where no cabin 83 is provided.

(e) FIFTH EMBODIMENT

The air conditioner 85, although disposed under the floor 84 of the cabin 83 in both the third and fourth embodiments above, may be disposed over the floor 84 of the cabin 83. The present fifth embodiment, which has been made focusing on this point, will hereinafter be described with reference to FIGS. 9A and 9B as well as FIGS. 10A and 10B. It is noted that the left side in FIGS. 9A and 10A corresponds to front side, the right side to rear side, the upper side to right side, and the lower side to left side, and for the sake of convenience, the same numerals are assigned to components in common with those in the third and fourth embodiments above to omit redundant descriptions as much as possible.

Figure 9A:
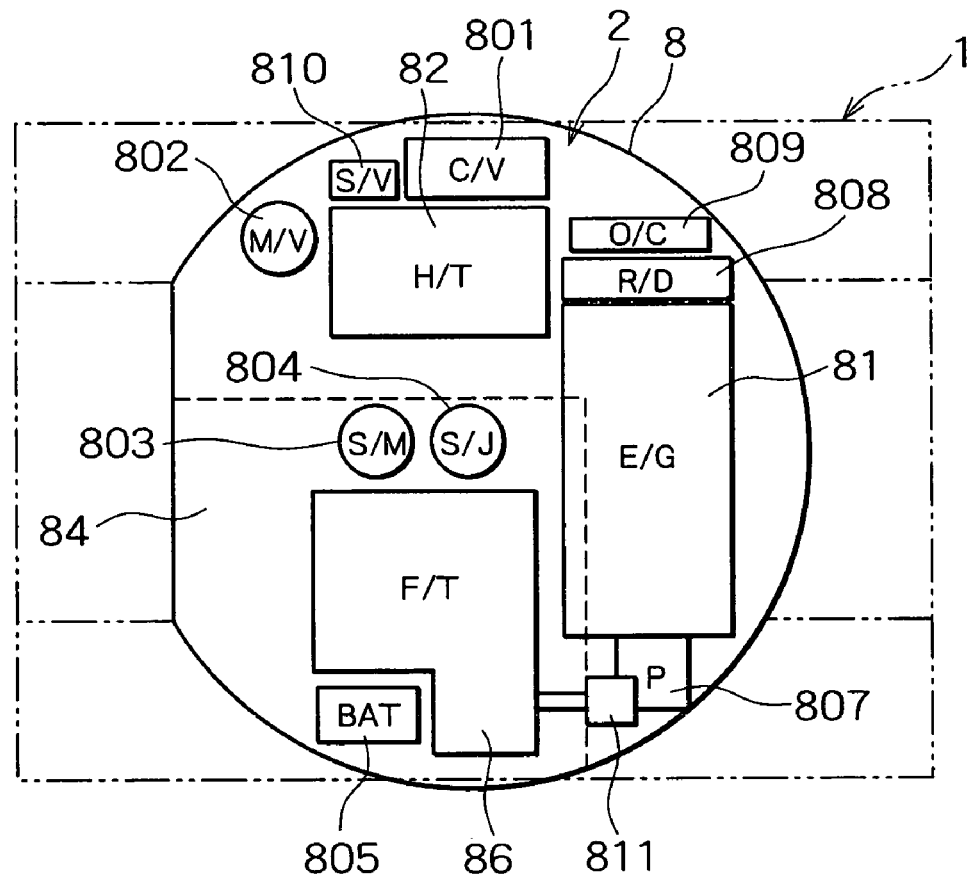
FIGS. 9A, 9B are views showing a detailed structure of a rotating frame of a small swing type excavator according to the fifth embodiment of the present invention, where
Figure 9B:
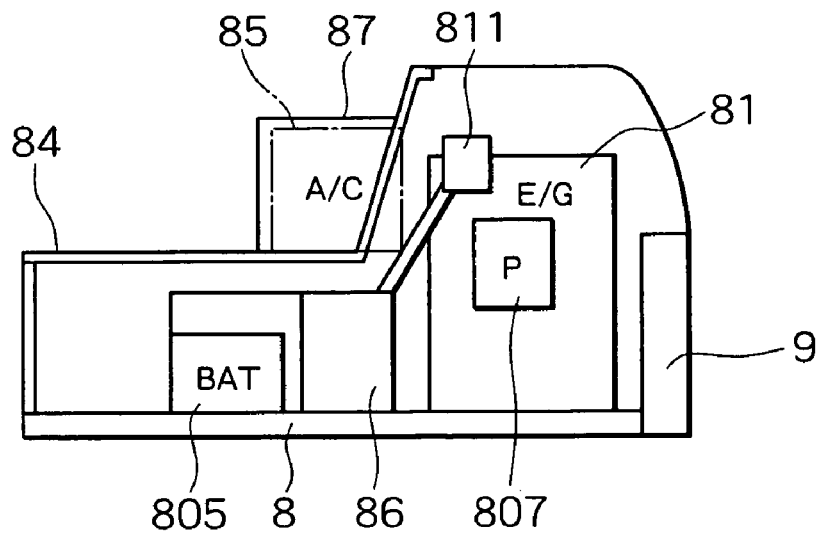

As shown in FIGS. 9A and 9B, in the present fifth embodiment, a hydraulic pump (P) 807, an engine (E/G) 81 as a power source, and a radiator (R/D) 808 and an oil cooler (O/C) 809 as cooling devices are disposed in a line from the left to right side in this order as rear row devices in the rear section of the rotating frame 8, as is the case with the third embodiment above. In front of the rear row devices, a hydraulic oil tank (H/T) 82 and a control valve (C/V) 801 are disposed in a line in this order on the right side of a swivel joint (S/J) 804, while on the left side thereof a fuel tank (F/T) 86 as front row devices. It is noted that the numeral 85 indicates an air conditioner (A/C), 802 a manipulation pattern switching valve (M/V), 803 a swinging motor (S/M), 805 a battery (BAT), and 810 a solenoid valve (S/V) as an operation lock valve.

The battery 805 is disposed on the left outside of the fuel tank 86. Thus, it is possible to shorten the arrangement space for devices longitudinally, giving advantages in terms of forming a short-radius excavator in which the rear end thereof is within the vehicle width. Also, it is possible to facilitate the maintenance of the battery 805, as well as, for example when cleaning the fuel tank 86, the detachment of the fuel tank 86 easily by detaching the battery 805. In particular, since the fuel tank 86 is less often maintained than the battery 805, the arrangement above is found to be effective.

The air conditioner 85 is arranged over the floor 84 of the cabin 83, for example, in a seat stand 87. Thus, the space under the floor 84 can be used more effectively, that is, for example, the volume of the fuel tank 86 can be increased. It is noted that the air conditioner 85 may be arranged at the ceiling part of the cabin 83, being not limited particularly within the seat stand 87. In this case, major devices can be arranged under the floor 84, whereby the volume of the fuel tank 86 can be increased.

The swinging motor 803 is arranged in front of the swivel joint 804. Thus, the space between the hydraulic oil tank 82, which is enlarged longitudinally to increase the volume thereof, and the fuel tank 86 can be used more effectively. It is noted that the swinging motor 803 may be arranged in rear of the swivel joint 804.

In order to ensure as much volume as possible, the fuel tank 86 is formed into an L shape when viewed vertically by depressing the part where the battery 805 is to be arranged at the left outer side in the rotating frame 8. The hydraulic pump 807 is to be located in rear of the fuel tank 86. Then, an oil filler port 811 extends up to the outer peripheral wall of the rotating frame 8, which allows fueling of the tank. Thus, the blank space over the hydraulic pump 807 can be used effectively.

The manipulation pattern switching valve 802, which is adapted to switch the motion pattern of actuators (not shown in the figure) for the operation of an operating lever 815 (refer to FIG. 10B) as an operation means among multiple selective motion patterns, is disposed in front of the hydraulic oil tank 82.

The solenoid valve 810 is adapted to lock the foregoing actuators hydraulically to be inoperative, the solenoid valve 810 being disposed in the vicinity of the hydraulic oil tank 82 in front of the control valve 801. Thus, elements having switching portions can be arranged around the control valve 810 in a concentrated manner, which makes it possible to perform maintenance in a lump from the same place.

The arrangement of pipes in a configuration according to the present fifth embodiment will be described.

Figure 10A:
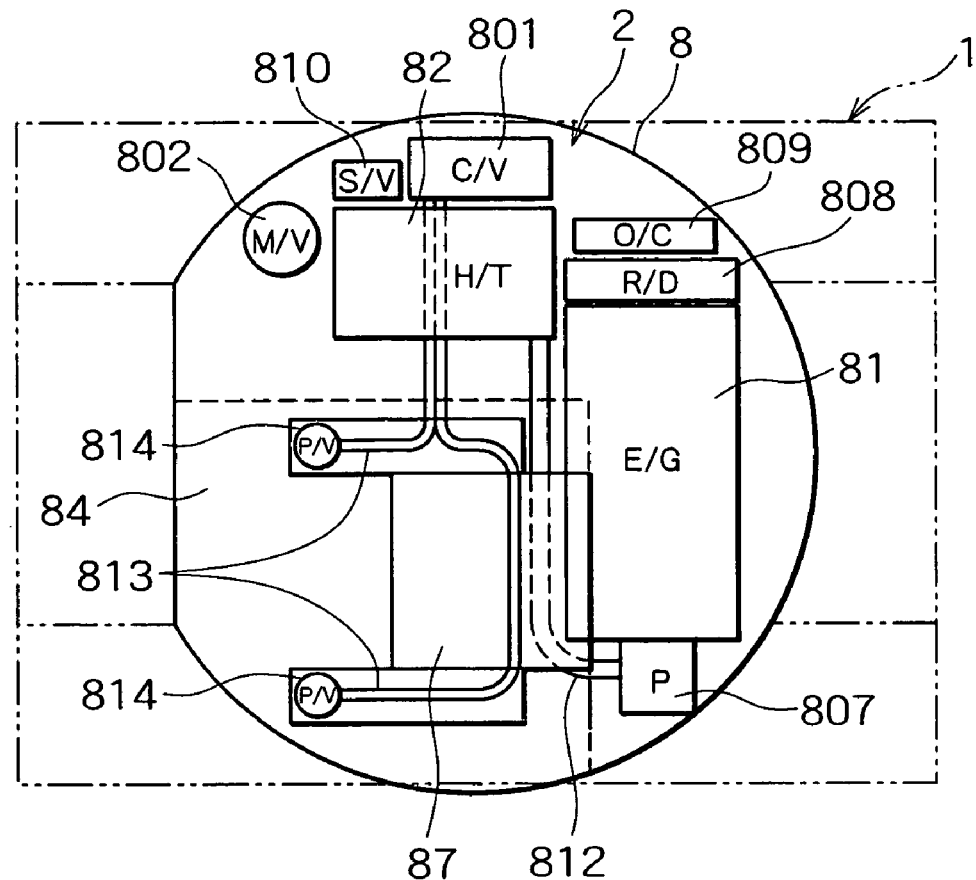
FIGS. 10A, 10B are views showing the arrangement of the major pipes in FIGS. 9A, 9B where
Figure 10B:
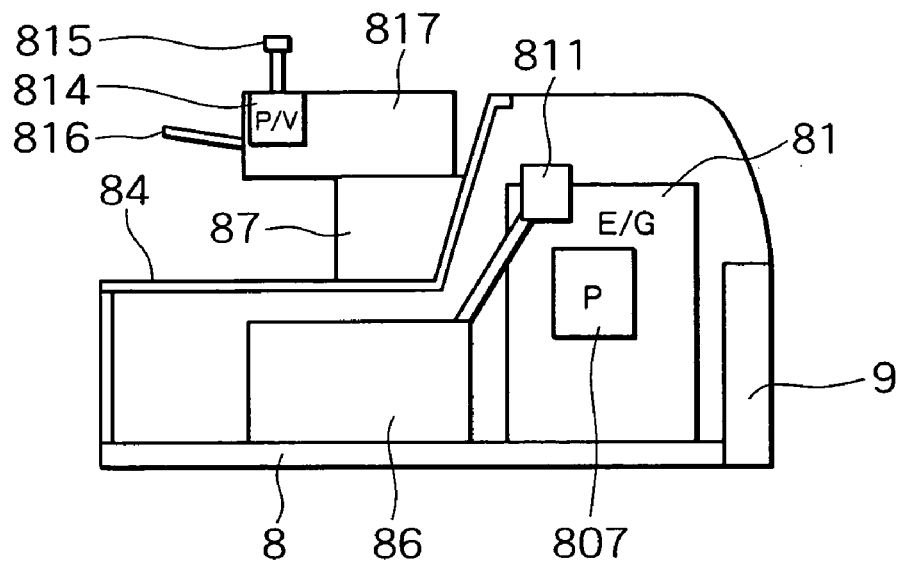

As shown in FIGS. 10A and 10B, a suction pipe 812 that communicates the hydraulic pump 807 and the control valve 801 is guided under the floor 84, while pilot pipes 813 that communicate the control valve 801 and pilot valves (P/V) 814 disposed over the floor 84 are guided over the floor 84. In this case, an arrangement of the pipes in the space under the floor 84 can be formed simply. Also, it is possible to shorten the distance between the pilot valves 814, which are attached in an integrated manner to operating levers 815 that are provided on operation boxes 817, respectively, on the right and left sides of the seat stand 87, and the control valve 801, whereby the pilot pipes 813 can be guided easily.

It is noted that the numeral 815 is an operating lever adapted to operate actuators in accordance with a desired motion pattern by switching the manipulation pattern switching valve 802 in advance so that the actuators operate in accordance with the desired motion pattern among multiple selective motion patterns. This allows operators to operate actuators in accordance with desired motion patterns easily.

Also, the numeral 816 indicates an operation lock lever adapted to be operated to turn the solenoid valve 810 on to close the pilot pipes 813. This allows actuators to be inoperative safely when operators get out of the cabin 83. However, a main pipe not shown in the figure may be closed instead of the pilot pipes 813.

As explained above, in accordance with the present fifth embodiment, in addition to the advantages of the third and fourth embodiments above, it is possible to arrange a short and simple return pipe (not shown in the figure) for putting pressure oil from the control valve 801 back to the hydraulic oil tank 82, whereby the back pressure of the control valve 801 can be kept at low level. Generally, in the case of a high back pressure of the control valve 801, the discharge resistance of pressure oil causes heat generation and the back pressure is added to supplied pressure from the hydraulic pump 807, resulting in an increase in power required for the hydraulic pump 807, which consequently runs counter to the saving of energy. Also, there is a possibility of having negative impacts on all aspects of the hydraulic pressure control circuit, such as a case that desired force cannot be obtained when operating each hydraulic actuator. Hence, in the present fifth embodiment is used the short return pipe, which enables the troubles above to be overcome.

Further, it is possible to dispose the suction pipe 812 that communicates the hydraulic pump 807 and the hydraulic oil tank 82 and a delivery pipe (not shown in the figure, but can be guided along the suction pipe) that communicates the hydraulic pump 807 and the control valve 801 between the rear row devices and the front row devices almost linearly, whereby the arrangement of pipes is facilitated, and while the length of the pipes is increased in comparison with the fourth embodiment above, pressure loss in the pipes can be reduced due to the linear arrangement. In particular, the suction pipe 812 has a large diameter, and therefore arranging the pipe with less number of bends has advantages in terms of ensuring the easiness of the arrangement and reducing pressure loss. In addition, although it is often the case that the rotating frame 8 is formed into a substantially circular shape, as mentioned above, to obtain as much an arrangement space for devices on the upper rotating frame 2 as possible, the size of the control valve 801, in accordance with the present fifth embodiment, disposed on the outside of the hydraulic oil tank 82 that requires a large space is relatively small, whereby the control valve 801 can be arranged along the arc-shape of the rotating frame 8, improving the usability of the space.

Furthermore, the fuel tank 86 is arranged under the floor 84, which allows effective use of the arrangement space for devices on the upper rotating body 2. In addition, the hydraulic oil tank 82 is arranged between the floor 84 of the cabin 83 and the control valve 801, whereby noises such as working oil flowing sound and restricting sound from such as flowing and squeezing sound the control valve 801 can be blocked out so as not to reach operators in the cabin 83 and not to reduce the comfort therein.

It is noted that although in the fifth embodiment above is described a case where the cabin 83 installing the air conditioner 85 is provided, no air conditioner 85 is installed in short-radius excavators comprising a canopy and opening the space over the floor 84 outward. Even in such a case, however, the space under the floor 84 can be used effectively by employing the configuration in which major devices are arranged under the floor 84 as described above.

Also, the solenoid valve 810 may be arranged in rear of the control valve 801, while the battery 805 may be arranged at the left end in rear side of the fuel tank 86, where depression of the fuel tank 86 is to be formed in accordance with the arrangement of the devices.

Further, although in the first to fifth embodiments above are described cases where the engine 81 is used as a power source, ones other than the engine 81 may be used. In the case of using an electric motor as a power source, for example, the radiator 808 as a cooling device becomes unnecessary. The radiator 808 and the oil cooler 809 may also be arranged on a single plane together.

Furthermore, it is possible to apply appropriate combinations of any of the first to fifth embodiments above. For example, the fuel tank 86 comprising an extension portion that extends to the front surface side of the air conditioner 85 in the first embodiment can be adopted to the second to fourth embodiments, and in this case, synergic advantages can be offered.

Also, although in the first to fifth embodiments above are described small hydraulic excavators as short-radius excavators, the present invention can also be applied to other short-radius construction machines.

INDUSTRIAL APPLICABILITY

As described above, the present invention is useful for a small swing type excavator in which an upper rotating body rotates in such a condition that the rear end thereof hardly projects outside the width of a lower traveling body, and is also suitable for a small swing type excavator in which a working device is attached pivotedly at the front end of an upper rotating body.

The invention claimed is:

1. A small swing type excavator, wherein an upper rotating body is mounted rotatably around a vertical shaft on a lower traveling body, rotating radius of a rear end of said upper rotating body being set to about one half of the width of said lower traveling body and devices being mounted on a rotating frame of said upper rotating body, comprising:

an operator cab disposed on one lateral side on said rotating frame, an air conditioner and a fuel tank provided, respectively, on an inner and an outer side in the width direction of the excavator and in a space under a floor of said operator cab, wherein said fuel tank comprises an extension portion extending to at least the front surface of said air conditioner.

2. The small swing type excavator according to claim 1, wherein said fuel tank is detachably attached to said rotating frame in such a condition that said extension portion extends along at least the front surface side of said air conditioner, and an opening portion capable of taking said fuel tank inside and outside therethrough is provided in an outer peripheral wall of said rotating frame.

3. The small swing type excavator according to claim 2, further comprising a cover portion adapted to cover said opening portion and provided in the outer peripheral wall of said rotating frame.

4. A small swing type excavator, wherein an upper rotating body is mounted rotatably around a vertical shaft on a lower traveling body, rotating radius of a rear end of said upper rotating body being set to about one half of the width of said lower traveling body and devices being mounted in a rotating frame of said upper rotating body, comprising:

a power source disposed in a rear section of said rotating frame in such a manner that the length of said power source extends substantially laterally, wherein the length of the power source is inclined from the lateral direction such that the lateral ends of said power source are longitudinally shifted with respect to each other and one of the lateral ends is disposed closer to the rear of said rotating frame than is the other of the lateral ends;

a hydraulic pump disposed at the one lateral end of said power source closer to the rear of said rotating frame;

a cooling device disposed at the other lateral end of said power source;

a fuel tank disposed in front of said hydraulic pump to be separated from said hydraulic pump by a predetermined space; and a hydraulic oil tank is disposed in said predetermined space.

5. The small swing type excavator according to claim 4, wherein said fuel tank is disposed on one side of a swivel joint mounted at the center of rotation, while a control valve is disposed on the other side of the swivel joint, wherein said fuel tank and said control valve are in front of said power source.

6. The small swing type excavator according to claim 4, wherein an operator cab is disposed on an upper surface of one lateral side of said rotating frame, and said fuel tank is arranged under a floor of said operator cab.

7. The small swing type excavator according to claim 4, wherein said hydraulic oil tank is formed into a fan shape in such a manner that said hydraulic oil tank spreads to widen in a direction outward from said rotating frame when viewed vertically.

8. The small swing type excavator according to claim 4, wherein said hydraulic oil tank is formed in such a manner that at least a part thereof reaches to under said hydraulic pump.

9. The small swing type excavator according to claim 5, wherein said rotating frame comprises an opening portion for maintenance at the end on the side where said control valve and said cooling device are provided, and a cover portion adapted to cover said opening portion.

10. A small swing type excavator, wherein an upper rotating body is mounted rotatably around a vertical shaft on a lower traveling body, and wherein a working device is attached pivotally at a front end of said upper rotating body, rotating radius of a rear end of said upper rotating body being set to about one half of the width of said lower traveling body and devices being mounted on a rotating frame of said upper rotating body, the rotating frame having a width which is substantially the same as that of said lower traveling body, the excavator comprising:

a support member for the working device protruding from the front end of said upper rotating body a hydraulic pump, a power source and a cooling device disposed laterally in a line as rear row devices in a rear section of said rotating frame;

in front of said rear row devices, a control valve and a hydraulic oil tank laterally disposed in a line on one lateral side centering on a swivel joint; and a fuel tank and a battery laterally disposed on the other lateral side, said control valve, said hydraulic oil tank and said fuel tank constituting front row devices, wherein the fuel tank is disposed between the battery and the swivel joint, and wherein the battery is disposed in a concave part of the fuel tank and outward of the fuel tank.

11. The small swing type excavator according to claim 10, wherein a swinging motor is disposed between said swivel joint and said hydraulic oil tank.

12. The small swing type excavator according to claim 10, wherein an air conditioner is disposed between said swivel joint and said fuel tank.

13. The small swing type excavator according to claim 10, wherein said fuel tank is arranged under a floor of an operator cab mounted on said upper rotating body.

14. The small swing type excavator according to claim 10, wherein said rear row devices are arranged laterally in the order of hydraulic pump, power source and cooling device, while said front row devices are arranged laterally in the order of fuel tank, swivel joint, hydraulic oil tank and control valve, said fuel tank being arranged under a floor of an operator cab mounted on said upper rotating body and said hydraulic pump being located in a rear side of said fuel tank.

15. The small swing type excavator according to claim 14, wherein an air conditioner is disposed over the floor of said operator cab.

16. The small swing type excavator according to claim 14, wherein a suction pipe that communicates said hydraulic pump and said control valve is guided under the floor of said operator cab, while a pilot pipe that communicates said control valve and a pilot valve disposed over the floor of said operator cab is guided over the floor of said operator cab.

17. The small swing type excavator according to claim 14, wherein a swinging motor is disposed in front or rear of said swivel joint.

18. The small swing type excavator according to claim 14, wherein an oil filler port of said fuel tank is disposed in the rear section thereof and above said hydraulic pump.

19. The small swing type excavator according to claim 14, wherein an operation pattern switching valve for switching a motion pattern of an actuator according to an operation of an operation means among multiple motion patterns is disposed in front of said hydraulic oil tank.

20. The small swing type excavator according to claim 14, wherein an operation lock means for locking actuators hydraulically to be inoperative is disposed in the vicinity of said hydraulic oil tank in front or rear of said control valve.

* * * * *